United States Patent [19]

Lui

[11] Patent Number: 4,958,551
[45] Date of Patent: Sep. 25, 1990

[54] COMPUTERIZED MUSIC NOTATION SYSTEM

[76] Inventor: Philip Y. F. Lui, 35 W. 64th St., New York, N.Y. 10023

[21] Appl. No.: 332,412

[22] Filed: Mar. 30, 1989

Related U.S. Application Data

[63] Continuation of Ser. No. 44,839, Apr. 30, 1987, abandoned.

[51] Int. Cl.⁵ .................. G09B 15/04; G10G 3/04; G10H 7/00
[52] U.S. Cl. .................. 84/462; 84/477 R; 84/484; 84/611; 84/DIG. 12
[58] Field of Search .................. 84/462, 477 R, 478, 84/484, 609–614, 634–638, 649–652, 666–669, DIG. 12

[56] References Cited

U.S. PATENT DOCUMENTS

| | | | |
|---|---|---|---|
| 4,297,934 | 11/1981 | Imamura et al. | 84/1.03 |
| 4,307,645 | 12/1981 | Rauchi | 84/1.03 |
| 4,399,731 | 8/1983 | Aoki | 84/470 R X |
| 4,454,796 | 6/1984 | Inoue et al. | 84/1.28 X |
| 4,454,797 | 6/1984 | Amano | 84/1.03 |
| 4,464,966 | 8/1984 | Ishida | 84/1.03 |
| 4,546,690 | 10/1985 | Tanaka et al. | 84/484 X |
| 4,616,547 | 10/1986 | Mancini et al. | 84/1.03 |
| 4,624,171 | 11/1986 | Yuzawa et al. | 84/1.03 |
| 4,646,009 | 3/1987 | Teruo et al. | 84/1.03 X |
| 4,708,046 | 11/1987 | Kozuki | 84/1.03 |

FOREIGN PATENT DOCUMENTS 2064851  6/1981  United Kingdom .................. 84/462

*Primary Examiner*—Stanley J. Witkowski
*Attorney, Agent, or Firm*—Leighton K. Chong

[57] ABSTRACT

A computerized music notation system includes a first keyboard having pitch keys, a second keyboard for entering relative rhythm codes representing the relative proportions by which the entered pitches and other rhythm types divide a beat and a terminator code to mark the end of each beat, and a computer executing a processing program for generating output music notation in beat units based upon the pitch data and the rhythm data. The pitch and rhythm data sets are independent of each other. The computer processes the pitch data assigning pitch names in the selected key of music, and the rhythm data in beat units by assigning computed fixed duration values to the rhythm types in accordance with the selected time signature. The pitch and rhythm data are combined and processed for output with other notation features, such as staff lines, stems, flags, beams, articulation marks, etc. Since the rhythm codes represent the relative spacings of the rhythm elements in beat units, they facilitate translation of the notation into a different time signature. The system is connectable to a display, permanent storage, a printer, an optical scanner, a synthesizer and/or other input coding or music output devices.

32 Claims, 13 Drawing Sheets

| RHYTHM TYPES: | PITCH | REST | TIE | DOT |
|---|---|---|---|---|
| MAIN DIVISION: | N | R | T | D |
| SUB DIVISION: | n | r | t | d |
| TERMINATOR | / | | | |
| AUTO TERMINATOR | A | | | |
| BEAT MULTIPLIERS: | 1x,2x,3x | | | |

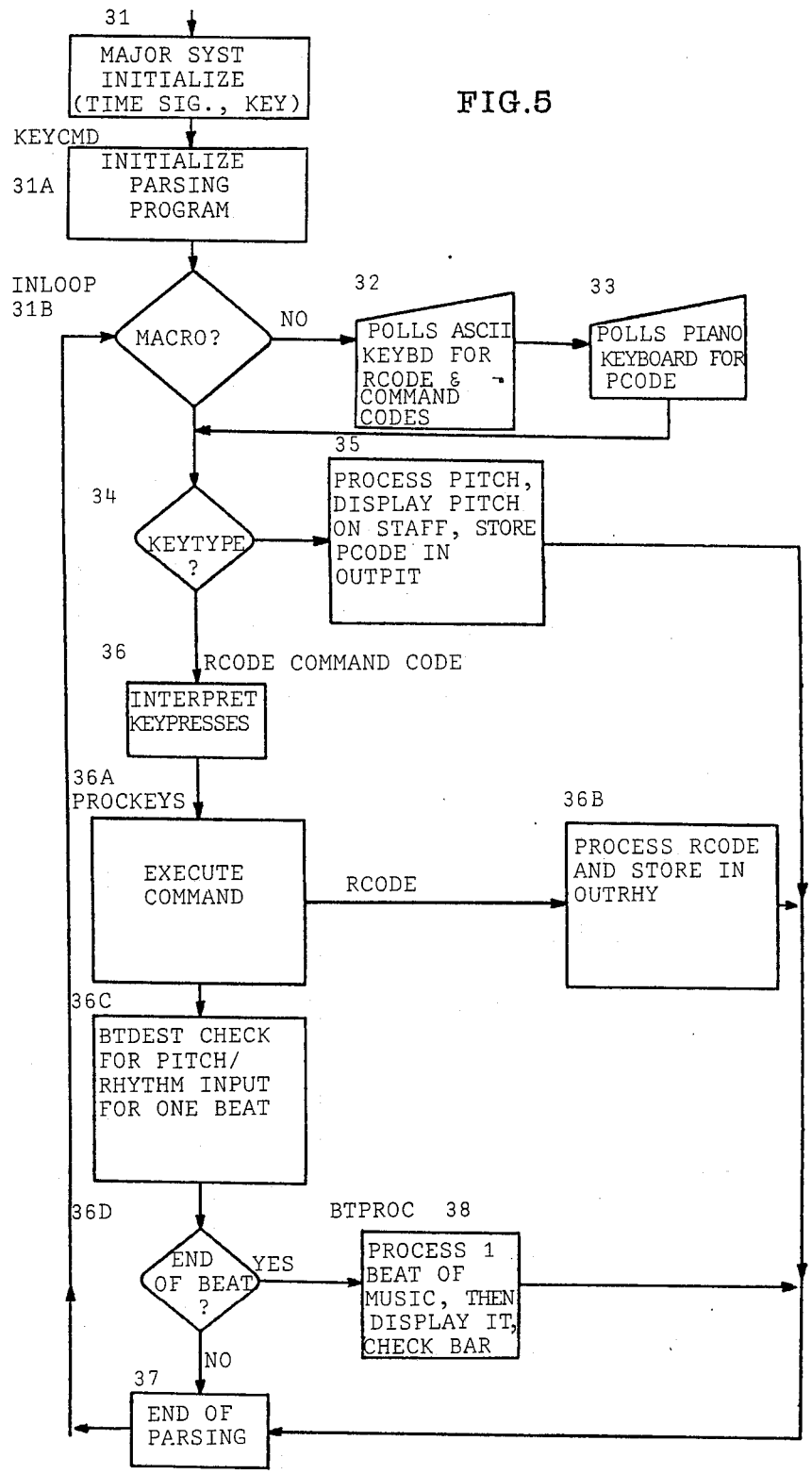

FIG. 12   BEAT STORAGE RETRIEVAL

BEAT DURATION: 1/4 NOTE IN 4/4 TIME

| RHYTHM CODE: | N | s | | n | T | / |
|---|---|---|---|---|---|---|
| BBCODE: | 8N | 8T | 8T | 8N | 2T | / |

| NTDATA: | | | | | |
|---|---|---|---|---|---|
| NOTE/REST | Note | | | Note | Note |
| STEMLEN | DEF. | DEF. | DEF. | DEF. | DEF. |
| STEMDIR | UP | UP | UP | UP | UP |
| NO.BEAMS | 2 | | | 3 | 1 |
| BEAMTILT | DEF | DEF | DEF | DEF | |
| TIE | | | | Yes | Yes |
| DOT | | Yes | | | |

FIG.14

```
KEYCMD
Simple Code rhythm              8       8       8       8
Pitch name                      C       D       E       F
Octave number                   3       3       3       3
Pitch x origin                  p1x     p2x     p3x     p4x
Pitch y origin                  p1y     p2y     p3y     p4y
Accidental name                 sh      -       fl      -
Accidental x origin             a1x     a2x     a3x     a4x
Accidental y origin             a1y     a2y     a3y     a4y BCODI
Bbcode rhythm code              N       N       N       N
proportion of Main Beat         4       4       4       4

BVNLOC
notehead symbol name            1/4N    1/4N    1/4N    1/4N
   Btdiv
   note symbol address          N       N       N       N
   Store
   note X origin                o1x     o2x     o3x     o4x
   note Y origin                o1y     o2y     o3y     o4y
Point Px                        Px1     Px2     Px3     Px4
Point Py                        Py1     Py2     Py3     Py4
Accidentals symbol name         sh      -       fl      -
Accidental X org                shX     -       flX     -
Accidental Y org                shY     -       flY     -
No. of dots                     -       -       -       -
Stemlen                         def     def     def     def
Flags                           -       -       -       -
Stemdir                         up      up      up      up
No. of beams                    2       2       2       2
Tiltval                         def     def     def     def
Tie                             -       -       -       -

BMRHY
Point Rx                        1Rx     2Rx     3Rx     4Rx
Point Ry                        1Ry     2Ry     3Ry     4Ry
Point Qx                        1Qx     2Qx     3Qx     4Qx
Point Qy                        1Qy     2Qy     3Qy     4Qy LV2DRW
Outputs vector tables, Ntdata

NOTATION DISPLAY;
```

FIG.15(a)
BEAT DURATION: 1/4 NOTE IN 4/4 TIME

| RHYTHM CODE: | N | N | N | N | / |
|---|---|---|---|---|---|
| BBCODE: | 4N | 4N | 4N | 4N | / |
| NTDATA: | | | | | |
| NOTE/REST | Note | Note | Note | Note | |
| STEMLEN | DEF. | DEF. | DEF. | DEF. | |
| STEMDIR | UP | UP | UP | UP | |
| NO.BEAMS | 2 | 2 | 2 | 2 | |
| BEAMTILT | DEF | DEF | DEF | DEF | |
| TIE | | | | | |
| DOT | | | | | |

FIG.15(b)
BEAT DURATION: 1/4 NOTE IN 4/4 TIME

| RHYTHM CODE: | N | n | N | N | / |
|---|---|---|---|---|---|
| BBCODE: | 6N | 6N | 3N | 3N | / |
| NTDATA: | | | | | |
| NOTE/REST | Note | Note | Note | Note | |
| STEMLEN | DEF. | DEF. | DEF. | DEF. | |
| STEMDIR | UP | UP | UP | UP | |
| NO.BEAMS | 2 | 2 | 1 | 1 | |
| BEAMTILT | DEF | DEF | DEF | DEF | |
| TIE | | | | | |
| DOT | | | | | |

FIG.15(c)
BEAT DURATION: 1/4 NOTE IN 4/4 TIME

| RHYTHM CODE: | N | R | n | N | n | t | R | / |
|---|---|---|---|---|---|---|---|---|
| BBCODE: | 4N | 8R | 8N | 12N | 12N | 12T | 4R | / |
| NTDATA: | | | | | | | | |
| NOTE/REST | Note | 1/32Rst | Note | Note | Note | Note | 1/16Rst | |
| STEMLEN | DEF. | DEF. | DEF. | DEF. | DEF. | DEF. | DEF. | |
| STEMDIR | UP | UP | UP | UP | UP | UP | UP | |
| NO.BEAMS | 2 | 3 | 3 | 3 | 3 | 3 | 2 | |
| BEAMTILT | DEF | DEF | DEF | DEF | DEF | DEF | DEF | |
| TIE | | | | | | Yes | Yes | |
| DOT | | | | | | | | |

COMPUTERIZED MUSIC NOTATION SYSTEM

This application is a continuation of application Ser. No. 044,839, filed Apr. 30, 1987 abandoned.

FIELD OF THE INVENTION

The invention relates to a computerized music notation system in which pitch codes are entered on an instrument keyboard and rhythm codes are entered on a control keyboard as data sets independent of each other. The pitches and rhythm codes are then processed together by a computer program in order to produce integrated music data for storage, modification, translation, display, printed music notation, synthesized music or other forms of output.

BACKGROUND OF THE INVENTION

Music notation has traditionally been written out by hand and entered in an automated system for publication as typeset or printed sheets. The manual process of handwriting, revising, and/or transcribing music notation can be very laborious for the music composer. For the music publisher, the conversion of handwritten notation into an automated typesetting or printing system requires the manual inputting of data, and only a limited capability exists for compositional modifications. The data generally must be reentered if the rhythm of the music is substantively changed.

Micro computers have been applied to music composition for digital processing of music data. Such computer systems allow a composer to compose on a keyboard and to store, manipulate, and output the data as synthesized music or as printed music notation. These systems have been generally of two types, i.e. realtime coding and non-realtime coding. In realtime coding systems, music is entered on an instrument keyboard, such as a piano-type keyboard, with exactly the timing and rhythm as it is intended to be played. The key inputs are analyzed by computer for their indicated pitches and the actual time durations and rhythms by which they are pressed on the keyboard in order to derive the proper notation. In non-realtime systems, the pitches are entered as separate data from their durations and rhythms.

As an example of a realtime system, Davis et al. U.S. Pat. No. 3,926,088 employs an organ keyboard on which an operator plays the pitch keys and a foot pedal which is pressed to indicate the start of each measure. The pitch keys in each measure are then processed into music notation according to the time durations and rhythmical ordering in which they are pressed. Such realtime systems have the disadvantage that the music must be played through with metronomic accuracy in order for the durations and ordering of the pitches to be analyzed correctly. The necessity of entering the pitch keys exactly as they are to be played severely limits the ability of the composer to compose or modify the music at the keyboard. Further, such systems have built-in limitations in discriminating notes of short durations or of complex rhythms.

In non-realtime systems, pitches are entered by selecting from an array of designated pitch keys, and the note durations associated with the pitches are entered separately by selecting from a prescribed set of binary fractions, i.e. halfs, quarters, eighths, sixteenths, etc., in order to define the desired music notes. Other rhythmical types, such as ties (continued notes) and rests (pauses), are entered in a similar manner as the pitches. For example, Rauchi U.S. Pat. No. 4,307,645 and Ejiri et al. U.S. Pat. No. 4,215,343 disclose non-realtime coding systems having keys for standard notes, ties, and rests in binary fractions. Namiki et al. U.S. Pat. No. 4,202,235 employs note duration keys in integer multiples of 1/16th intervals.

Such non-realtime systems are cumbersome to use since a specific duration is assigned in a fixed relationship to each pitch key. These systems have little capability of modifying the music notation into different time signatures without reentering the data. Moreover, the same rhythm representations in some cases may be played with different actual time durations, since conventional music notation uses binary note symbols whereas more complex rhythm structures may be desired. The assignment of a fixed binary symbol t each pitch in conventional systems would therefore result in music data that did not represent actual time durations for a wide range of rhythms, and would limit the usefulness of the data, for example, for playing the music on a synthesizer.

SUMMARY OF THE INVENTION

In view of the aforementioned limitations of conventional systems, it is a principal object of the present invention to provide a computerized system in which pitch data and relative rhythm data are entered as data sets independent of each other, and then are processed together to generate an integrated music data output. A central feature of the invention is that the rhythm data represent the relative proportions by which the pitches, rests, ties, and other rhythm types divide a basic music interval, such as the main beat, so that their relative proportions remain specified even if the time signature of the beat is changed. It is a further object that a screen display, printed music notation and other forms of output can be generated from the pitch and rhythm data responsive to a wide range of selected compositional parameters, and can be modified or changed by computer processing without having to reenter the original data.

In accordance with the invention, a computerized music notation system comprises: (a) first entry means for entering pitch data representing a series of tone pitches; (b) second entry means for entering relative rhythm data representing the relative proportions by which selected rhythm types, including the pitches as one rhythm type, divide a basic music interval, such as a beat of the music, wherein the rhythm data includes at least a first rhythm code indicating each main division of the beat by a pitch and a demarcator code delimiting each beat; (c) processing means for processing the rhythm data with the pitch data, including (1) means for assigning relative beat division values to the rhythm codes of each beat in accordance with beat divisions indicated by the relative rhythm data, (2) means for selecting a fixed duration value assigned to each beat, (3) means for calculating fixed beat division values for the rhythm codes in each beat in accordance with the fixed duration value assigned to the beat and the relative beat division values assigned to the rhythm codes, and (4) means for linking the fixed beat division values for the rhythm codes to corresponding ones of the series of pitches; and (d) output means for providing an output of the pitches linked to their corresponding fixed beat division values.

The above-described basic structure of the invention provides for the pitch data to be entered independently of the corresponding relative rhythm data, and the two sets of data are processed together to assign fixed duration values to the pitches according to a selected time signature. In the preferred implementation of the invention, the main beat of the music is the basic duration interval, i.e. the preferred system is beat oriented. In standard music notation, the time signature indicates the number of beats per measure and the note duration of each beat, e.g. half-note per beat, quarter-note per beat, etc. The system according to the present invention processes the pitch data and the relative rhythm data together by assigning note duration values to the pitches calculated according to their relative proportions within a beat and the note duration per beat.

The relative rhythm coding of the invention also includes rhythm codes for other rhythm types, i.e. ties, rests, and dots, as well as subdivision codes for designating subdivisions of any main division of a beat by the rhythm types. The codes are selected to correspond to conventional types of rhythm notations, so that entry and interpretation of the rhythm codes parallels conventional music notation for the convenience of the user. The rhythm codes constitute a relatively small code set, yet they allow expression of music notation to a high degree of rhythmical complexity. The main division and subdivision codes permit the user to encode note durations other than conventional binary fractions, e.g. ⅓rd, 1/5th, 1/6th 1/7th notes, etc.

If the user desires to have music notation translated into a different time signature, the original pitch and relative rhythm data can be retrieved from storage, and the note durations of the pitches and other rhythm types can be recomputed for the new time signature. Since the relative rhythm codes represent the intended proportions by which the rhythm types divide each beat, the same rhythm codes can be used both to generate music notation using standard binary note symbols, and also as data to a synthesizer representing the actual durations of the notes to be played. The key of music can also be selected as a system parameter, and the corresponding pitch names and the proper locations and notehead styles of the notes on a musical staff are defined during processing of the pitch data in the selected key.

The preferred system configuration of the invention includes an instrument keyboard for entering pitch data by pressing corresponding pitch keys, a control keyboard for entering the relative rhythm codes, as well as command codes for selecting the parameters of and operating the system, a computer for executing the program for processing the pitch and rhythm data, and associated output devices such as a display screen, a printer, a music synthesizer, and/or a data storage device. Pitch and relative rhythm data for the system can also be derived by computer processing in reverse sequence to that described above, from input obtained through digital scanning and feature recognition of original music notation.

Other features of the computerized music notation system of the invention include program routines for deriving ledger lines, staff notations, stems, flags, beams, dotted notes, notehead designs, articulation marks, line, measure, beat, and note spacings, and other aspects of fully featured music notation. The invention is advantageous for a wide range of applications, e.g. composition, music synthesis, printing of music notation, computerized music archiving, and performing high speed retrieval, regeneration, and modification of music data under computer control.

BRIEF DESCRIPTION OF THE DRAWINGS

The above-mentioned objects, purposes, features, and applications of the invention are described in further detail below in conjunction with the drawings, of which:

FIG. 5 is a flow diagram of the Main Parsing Loop for pitch and rhythm data in the preferred notation processing program of the invention;

FIG. 14 is a chart of some attributes of notation parameters and output data generated by the notation processing program of the invention;

FIGS. 15(a), 15(b), 15(c), and 15(d) show some examples of the conversion of rhythm code sequences to output notation in the preferred system of the invention.

DETAILED DESCRIPTION OF THE INVENTION

Music Notation Conventions

In the following description, certain conventions and terminology for music and music notation are used. These are discussed below in order to explain their intended meaning. However, it should be understood that the invention is deemed not to be limited by the conventions and terminology used within this description, but rather shall encompass the full range of potential forms and applications to which its general principles might be adapted.

Figures 1, 2:
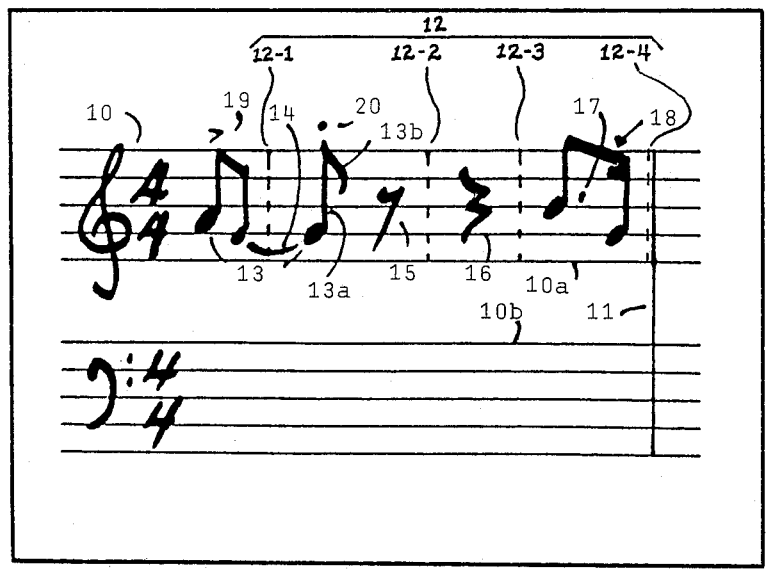
FIG. 1 illustrates an example of conventional music notation.
FIG. 2 is a chart depicting conventional note symbols for pitches and other rhythm types.

Referring to FIG. 1, a musical score is written with notes marked on ledger lines 10, which are grouped in staffs 10a, 10b, indicating treble and bass clefs in which the music is played. The position of the notes on the lines or spaces of the staff represent the pitch of the note in the indicated octave. A fundamental key of the music ("C major" in FIG. 1) is selected to define the starting pitch of the octave scales indicated by the musical staff.

The staff lines are divided horizontally into measures by vertical bars 11. Each measure or bar of music is composed of a series of regular beats 12 which form the primary recurring rhythmic pulse of the music. For the implementation of the invention as described herein, the beat is the basic music duration interval for which music data are coded. A time signature is selected for the score to define the number of beats to a bar and the notehead expression of each beat. Thus, in the example of FIG. 1, music written in 4/4 time signature has four beats 12-1, 12-2, 12-3, 12-4, to a bar and each beat has a quarter note duration. The actual time duration of each beat depends upon the tempo by which the music is played. The tempo is set by individual interpretation, or may be set by a timing scale in music synthesizers.

The rhythm of the music, i.e. the ordering of sound, is defined by certain conventional rhythm elements or types, which include pitches 13, ties (continued pitch) 14, rests (pauses) 15 and 16, and dots (dotted notes) 17. A dot follows a pitch note or rest symbol and indicates a sustaining of one half the duration of the associated note. It can also be used as an abbreviation for several ties. Pitch notes and rests have different notations depending on their duration. In FIG. 2, the conventional notehead designs using binary symbols for note duration are shown, along with the notations for ties and dotted notes.

An octave on a piano keyboard has a regular progression of 7 pitch names and 12 semitones from one octave to the next. In the key of C, for example, an octave progresses by pitches named C, D, E, F, G, A, B, C. The progression of pitches of an octave depends upon the keynote pitch and the convention for the progression of keys on the keyboard. Some pitches are assigned different pitch names depending on the key of the music.

Pitch notes are indicated in music notation by an inclined oval dot which, for fractions of a whole note, have a stem 13a on the left or right side. The stems may have flags 13b indicating binary note fractions, or they may have a beam 18 joining the stems of a group of notes in a beat. Beams can have different angles of inclination and lengths depending on the ascent or descent of the grouped notes, and may have multiple beam lines representing binary fractions to express divisions of the beat.

The actual duration by which flagged or beamed notes are played depends upon the proportions by which the notes divide a beat and the note duration assigned to the beat. If the actual duration of the note is a non binary fraction of the beat, the convention in music notation is to depict the note with the closest binary fraction representation. For example, for a quarter-note beat interval, two combined (beamed) eighth-notes indicate two pitches each played with an eighth-note duration, whereas three beamed eighth-notes (a triplet) are used to indicate three pitches each played in one-third of the quarter-note beat interval. Thus, the conventional binary representations in music notation do not necessarily correspond to the actual durations of the notes when performed. Two or more notes beamed together may have a spline indicating that they are a dublet, triplet, etc. Standard music notation also includes articulation marks, such as for emphasis 19, de-emphasis 20, etc.

Overall Computer System

Figure 3:
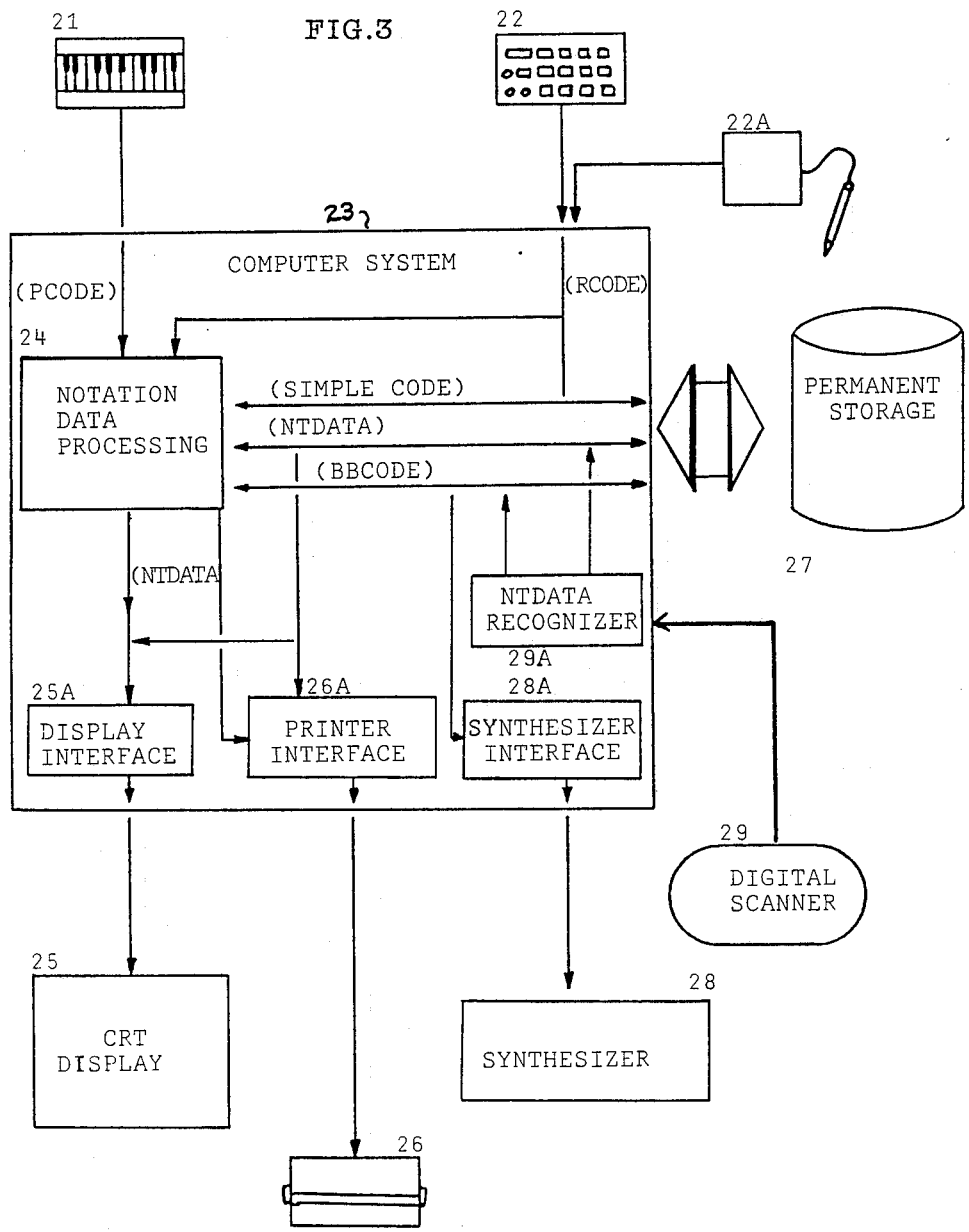
FIG. 3 is a schematic diagram of an overall computer system configuration including associated input and output devices and computer processing sections in accordance with the invention.

In accordance with the invention, a preferred system configuration is shown in FIG. 3. An instrument keyboard 21, such as a piano-type keyboard, is used to enter pitch codes corresponding to the pitch keys depressed into computer system 23. A control keyboard 22, such as a standard ASCII keyboard, is used to enter rhythm and command codes into computer system 23 as an independent data set. For ergonomic ease of use, the rhythm codes may be entered by other types of input devices such as foot pedals, a speech recognition module, light pen, mouse, head movement monitor, or other type of simple coding device.

The computer system 23 executes a program for music data processing functions, of which the main part in this invention is the notation data processing section 24. This section receives input pitch codes (PCODE) from instrument keyboard 21 and rhythm codes (RCODE) from command keyboard 22 or input device 22a, and processes them together in a Main Parsing Loop which generates output data tables (NTDATA) specifying music notation characteristics for final output to a screen display 25, through display interface 25a, and/or to a printer 26, through printer interface 26a. Permanent storage 27 is connected to computer system 23 for storage and retrieval of the notation data, and also of the original data sets PCODE and RCODE in Simple Code Form, and an intermediate rhythm data set BBCODE, as described further below. Previously stored Simple Form Code or BBCODE can be retrieved from permanent storage 27 and processed with modified compositional parameters by processing section 24 into a modified output for display or printing.

The pitch and rhythm data, preferably in the intermediate BBCODE form, can also be output to a music synthesizer, through synthesizer interface 28a, for producing sound. The pitch and rhythm data can also be derived by reverse processing of notation data provided from a digital scanner 29 used to scan an original printed or handwritten music sheet. The input from scanner 29 can be decoded by a feature recognition algorithm through recognizer 29a to extract data on notation characteristics in the same format as NTDATA, so that it is stored, processed, and/or output through the other parts of computer system 23 and its peripheral devices. Alternatively, a low level recognition algorithm can be used to extract pitch and rhythm data in the Simple Form Code or intermediate BBCODE formats.

The components of the above-described system ca be assembled from computer equipment which is commercially available. The basic processing functions of the notation data processing section 24, receiving pitch and rhythm code inputs and providing NTDATA output for display or printing, will now be described.

Notation Data Processing

The system is initialized and the desired compositional parameters, such as time signature, key of music, main beat, notation form, spacings, etc., are entered by command codes on control keyboard 22. Once the system is initialized for composing, the user enters pitch codes by pressing keys on the instrument keyboard 21, and rhythm codes on the control keyboard 22 or ergonomic input device 22a. The two data sets are entered in non-real time, i.e. independent of each other and without regard to the actual way the final music is intended to be played. For example, the user may play the pitch keys for a beat, measure, line or several lines of music, then go back and enter the rhythm codes corresponding to those units. The user may also play the pitch keys while simultaneously entering the rhythm codes, by key presses, foot pedal control, speech command, etc., in or near realtime. If the rhythm codes are a series of recurring codes, they can be entered automatically by a macro command. The flexibility of entering rhythm codes as an independent data set from the pitch codes is an important advantage of the invention.

Figure 10:
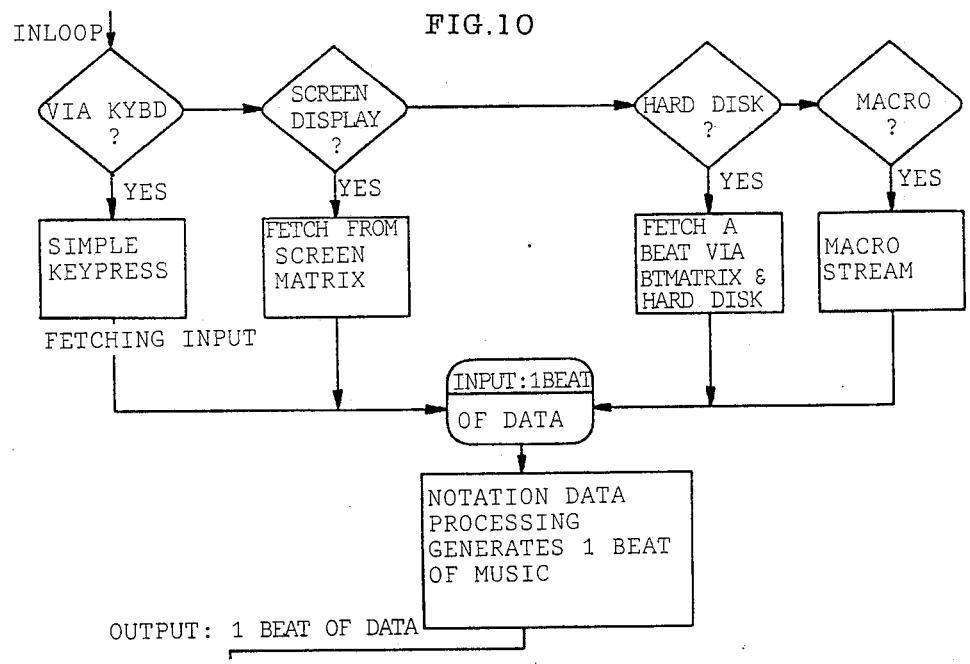
FIGS. 10 and 11 are schematic diagrams of input and output functions for a beat of music.
Figure 11:
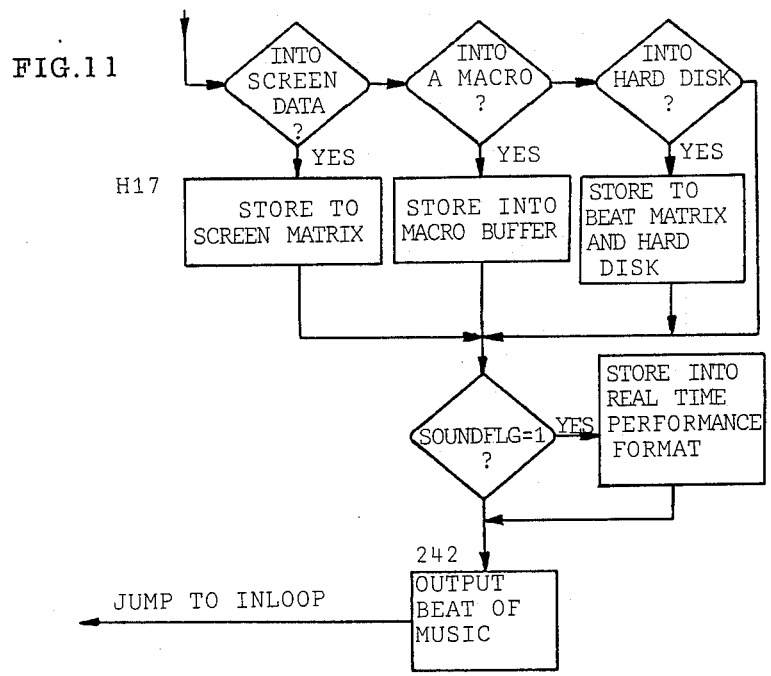

As the two streams of pitch and rhythm codes are entered, they are temporarily stored in buffers and parsed in Simple Form Code through the Main Parsing Loop shown in FIG. 5. In the described implementation of the invention, the notation processing section 24 processes pitch and rhythm data in beat units, i.e. according to the main beat specified by the selected time signature. The pitch and rhythm codes are thus processed by the beat processing loop BTPROC shown in FIG. 6, and by the beat data generating routines LV1DRW, BCODI, BVNLOC, and BMRHY, and display output routine LV2DRW, shown in FIGS. 7-9, from intermediate BBCODE into output tables NTDATA which completely specify the beat units of music notation for output on the display screen 25 or the printer 26. The input and output routines for the beat data are shown in FIGS. 10 and 11. Previously stored data can be retrieved by the routine shown in FIG. 12 and regenerated as shown in FIG. 13 for a modified output using new compositional parameters or for mass output, such as for high speed printing.

Relative Rhythm Coding

A central feature of the invention is the use of rhythm codes which represent the relative proportions of rhythm types within a defined music interval, such as a beat. The fundamental music interval in Western music is the main beat. The use of relative proportion values for the rhythm elements allows their representation within a beat to remain unchanged even if the time signature of the beat or tempo of the music is changed. Thus, the notation can be readily changed for a different time signature, or one or both of the pitch and rhythm code sequences can be retrieved and modified, without having to reenter all of the original data.

The preferred set of rhythm codes of the invention are selected to have a one-to-one correspondence to the rhythm types recognized in conventional music notation, for the convenience of the user in entering and interpreting the rhythm code sequences. The preferred rhythm codes thus comprise a set of main division codes, representing each rhythm type, i.e. pitch, tie, rest, or dot, which may divide a beat, subdivision codes for each rhythm type subdivision of a main division, a beat demarcator code, and beat multiple codes for a rhythm element occupying a multiple beat. Each beat is processed with all rhythm elements related to either main divisions, subdivisions, or multiples of the beat interval. The pitch codes entered as an independent data set are related in correspondence to the rhythm codes for pitches, and the integrated data can then be further processed to provide a display or printed output of fully featured music notation.

Figures 4, 6:
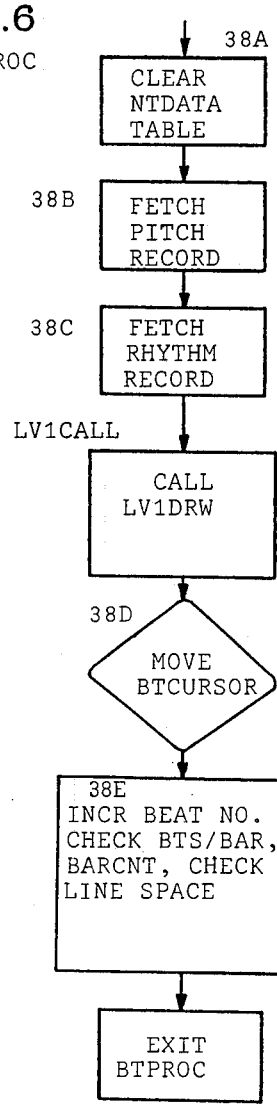
FIG. 4 is a chart of a preferred set of relative rhythm codes used in the invention.
FIG. 6 is a flow diagram of the Beat Processing routine of the processing program for processing the pitch and rhythm data in beat units.

The preferred set of rhythm codes is shown with representational characters in FIG. 4. Each pitch entered on the instrument keyboard is associated with the pitch rhythm code "N" if it is a main division of a beat. A pitch subdivision of a main division is denoted by "n". Similarly, rests are denoted by "R" if they are main divisions of a beat unit, or by "r" if they are a subdivision of a main division. Ties are indicated by "T" and "t" and dots by "D" and "d" for corresponding main divisions and subdivisions. By convention, a beat interval cannot begin with a dot or with any subdivision. The end of a beat interval is denoted with a terminator code such as "/". For example, if a beat is composed of two pitches of equal duration, the rhythm codes "N, N, /" are keyed in. If a beat is composed of two pitches which are the onset of two equal intervals, and the first interval includes another pitch which subdivides the first interval, then the codes "N, n, N, /" are keyed in. Examples of other rhythm code sequences are shown in FIGS. 15(a)-15(g), together with their resultant data table and music notation.

By using a stream of codes to represent each rhythm element in the beat intervals, the relative duration values of the elements become implicit in their order and number, and the absolute duration of the elements can be derived for any specified beat duration (time signature). The use of subdivision codes provides a second order level of beat complexity which is commensurate with the limits of human performance of music. Higher order levels of relative rhythm coding may of course be used.

According to the principles of the invention, it is apparent that other rhythm code sets or more specialized rhythm types may instead be used. For example, beat division codes may indicate the proportions of beat divisions by numerical weights, the rhythm types may be numerically coded, independently entered, or entered with the pitch codes, a beat commencing code instead of terminator code may be used, or the basic duration interval may be a measure of music rather than a beat. Such variations are nevertheless encompassed within the principles of relative rhythm coding as disclosed herein.

Since each beat is delimited by a terminator code, the rhythm codes can be input without any required continuity, as can the pitch codes. The notation processing program parses the two independent data streams through the Main Parsing Loop and processes a beat output whenever sufficient pitch data and rhythm data followed by a terminator code are input. The terminator code is used herein as a beat delimiter, but a beat initializer could instead be used. The relative rhythm coding also includes an autoterminator code "A" for providing a recurring series of rhythm codes followed by a terminator code automatically when the music being composed has a regular number of pitches in equal main divisions of each beat. This allows the rhythm coding to be handled automatically by a single keystroke for convenience of data entry for many standard rhythms.

The main rhythmic types, i.e. pitches, rests, ties, or dots, represent the conventional musical rhythmic notations. Depending on the time signature and the main beat duration, any combination of these rhythmic types may be used in a beat, and the resultant notation for a beat may be expressed with the notes joined together by horizontal beams and tuplet indicators. If the time signature is changed, the relative proportions of the rhythm elements are nevertheless preserved over the current fraction or multiple of the original main beat, and the resulting notation may be expressed differently, i.e. with multiple or no horizontal beams or different notehead designs.

The relative rhythm coding includes auxiliary codes for multiples of a beat unit, e.g. when a rhythm element has a duration of multiple beats. In FIG. 4, three integer multiple codes are shown. Also, a particular series of rhythm codes which is used frequently may be input through a single keystroke by use of a macro key, which provides a stored stream of characters as input codes.

The relative rhythm coding of the invention is selected to be a small, manageable set, but it may of course may be expanded if more complex rhythm coding functions are desired. A small set of rhythm codes allows the rhythm data to be input rapidly and with a minimum of interruption so that the user can simultaneously input the pitch codes from the instrument keyboard 21 if so desired. In the system shown in FIG. 3, the rhythm coding is entered by any selected alphanumeric keys on the control keyboard 22, but it may instead be entered through other, more ergonometric input devices such as foot pedals, a speech recognition unit, a monitor for head movements, or pointing or contacting devices such as a light pen, touch tablet, mouse, etc.

Main Parsing Loop

The Main Parsing Loop for pitch and rhythm codes in beat units is shown in FIG. 5. Block 31 indicates the major system initialization steps, such as interfacing the various system components for the notation processing mode. KEYCMD at block 31a indicates the initialization steps for user parameter selections and establishing the internal parsing program to receive and process pitch and rhythm codes as they are input from the instrument keyboard 21 and control keyboard 22, and to display the output notation on staff lines set up on the CRT display 25 for visual confirmation to the user. Program control then enters INLOOP at block 31b, which commences with a test whether a macro sequence of codes is being stored or sent. If no macro sequence is in effect, the parsing program polls the control (ASCII) keyboard for a command or rhythm code (RCODE) keypress, at block 32, and the instrument keyboard for a pitch code (PCODE) keypress, at block 33. Simultaneous pressing of more than one pitch key (a chord) is treated as one pitch key event for purposes of the description herein.

The program proceeds to block 34 which sends the PCODE to block 35 where the pitch is identified and displayed on the staff lines as it is entered (without rhythm information) for visual confirmation. Pitch processing at this stage includes determination of all attributes of pitch information needed for proper musical notation, e.g. pitch name, accidentals (sharp or flat), location on the staff lines, a chord, etc. The processed pitch data are then stored in a temporary pitch buffer OUTPIT.

A command keycode or the RCODE is branched from block 34 to block 36, where it is interpreted, and then to PROCKEYS at block 36a. The PROCKEYS routine executes an indicated command, or branches the RCODE to block 36b where it is converted t Simple Form Code (binary number) and stored in a temporary rhythm buffer OUTRHY. The parsing program then goes to block 37 at the end of the parsing loop where it returns to INLOOP. At block 36c, a check BTDEST is made whether sufficient rhythm and pitch codes have been received for a beat and whether a beat termination code is received. If so, the program branches at block 36d to execute the BTPROC routine at block 38, which is the main routine for generating the complete output notation for each beat. When an output beat is generated, it is displayed on the staff lines (the pitch-only display is erased), then the beat counters are incremented and a vertical bar line is drawn if a measure of music has been completed. The parsing loop then receives the next input by returning to INLOOP.

Beat Processing

Referring to FIG. 6, the main beat processing routine BTPROC commences by clearing an output data table NTDATA for the beat, at block 38a, fetching the current beat pitch record from OUTPIT at block 38b, and fetching the current beat rhythm record from OUTRHY at block 38c. The program enters LV1CALL and calls the routine LV1DRW, described further below, for processing the pitch and rhythm data into its final output form, which is then stored as output data and displayed as a completed beat on the CRT display. The program then moves the beat cursor to the current beat space on the staff lines of the display, at block 38d, and increments the beat counter, checks the space remaining on the current line, and checks the beat count for a completed measure, at block 38e. The program then exits BTPROC and returns to INLOOP in the Main Parsing Loop for the next beat.

Figure 7:
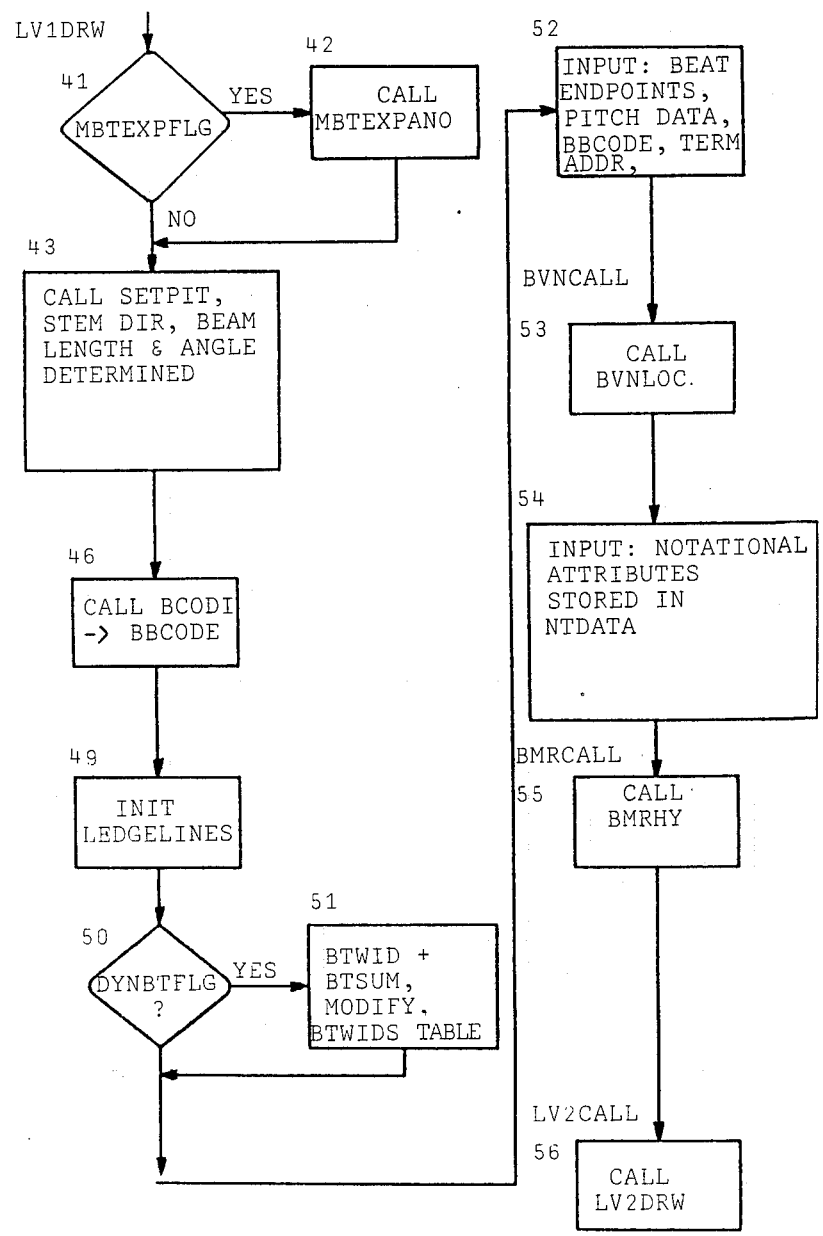
FIG. 7 is a flow diagram of the LV1DRW routine for processing the pitch and rhythm data into an integrated music data output form.

The routine LV1DRW, shown in FIG. 7, commences by checking at block 41 whether the code for a multiple beat interval (beat multiplier code in FIG. 4) is present. If so, the routine MBTEXPAND is called at block 42 to expand a beat interval code into two or more beat interval codes in a form compatible with subsequent rhythm data processing. At block 43, the routine SETPIT is called to process the pitch data further to determine the stem direction (upward or downward) and any flag or beam attributes for the output notation. At blocks 44 and 45, a check of the stem direction is made and the pitch data is modified so that the specification of notes corresponds to the proper stem direction.

The program then proceeds to block 46 where the further routine BCODI is called to convert the rhythm data for the beat from Simple Form Code to the intermediate form BBCODE. BBCODE is a conversion of the rhythm codes from a simple number to a form where the relative proportion of each rhythm code element within a beat is expressed. At blocks 47 and 48, a check is made whether the current beat is a multiple of the main beat interval and, if so, the beat width and end of beat notation are appropriately modified. At block 49, the ledger line data for the current beat is initialized. At block 50, a check is made whether the current beat is the end of a series of beats having simple notation which can be compressed into a smaller width for one measure on a line of output notation, referred to herein as a "dynamic beat". If so, the beat widths are recalculated and modified, at block 51, and a compressed notation for the measure is substituted for the constituent beats.

At block 52, the pitch and rhythm data is now sufficiently specified so that processing of them together can take place. At BVNCALL 53, the subroutine BVNLOC is called to merge the pitch and rhythm data together, as explained further below. The output of BVNLOC is integrated information on all required attributes of the note(s) occupying the current beat (at block 54). In preparation for final processing for an output display of notation, the integrated information is input at BRMCALL 55 to the subroutine BMRHY which calculates all of the stem, beam, and beat dimensions corresponding to the specified note(s) in accordance with standard music notation. The program then proceeds to LV2CALL 56 where the output graphics display subroutine LV2DRW is called. This completes the processing and output display of one beat of music, and control then returns to the Main Parsing Loop for the next beat.

Beat Subroutines

Figure 8A:
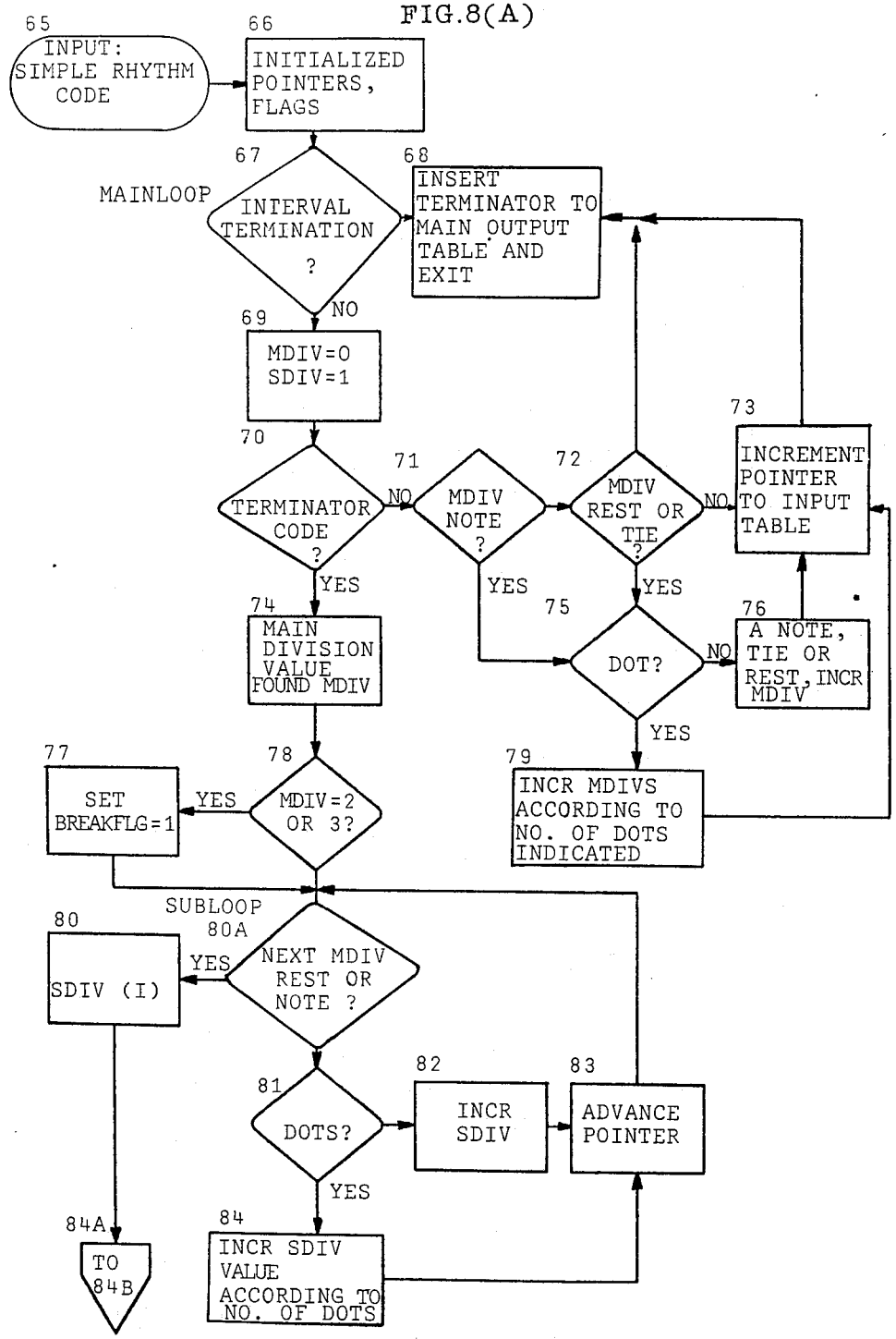
FIGS. 8(a) and 8(b) are flow diagrams of the BCODI subroutine of LV1DR for converting the input rhythm codes into rhythm data with assigned relative beat division values.
Figure 8B:
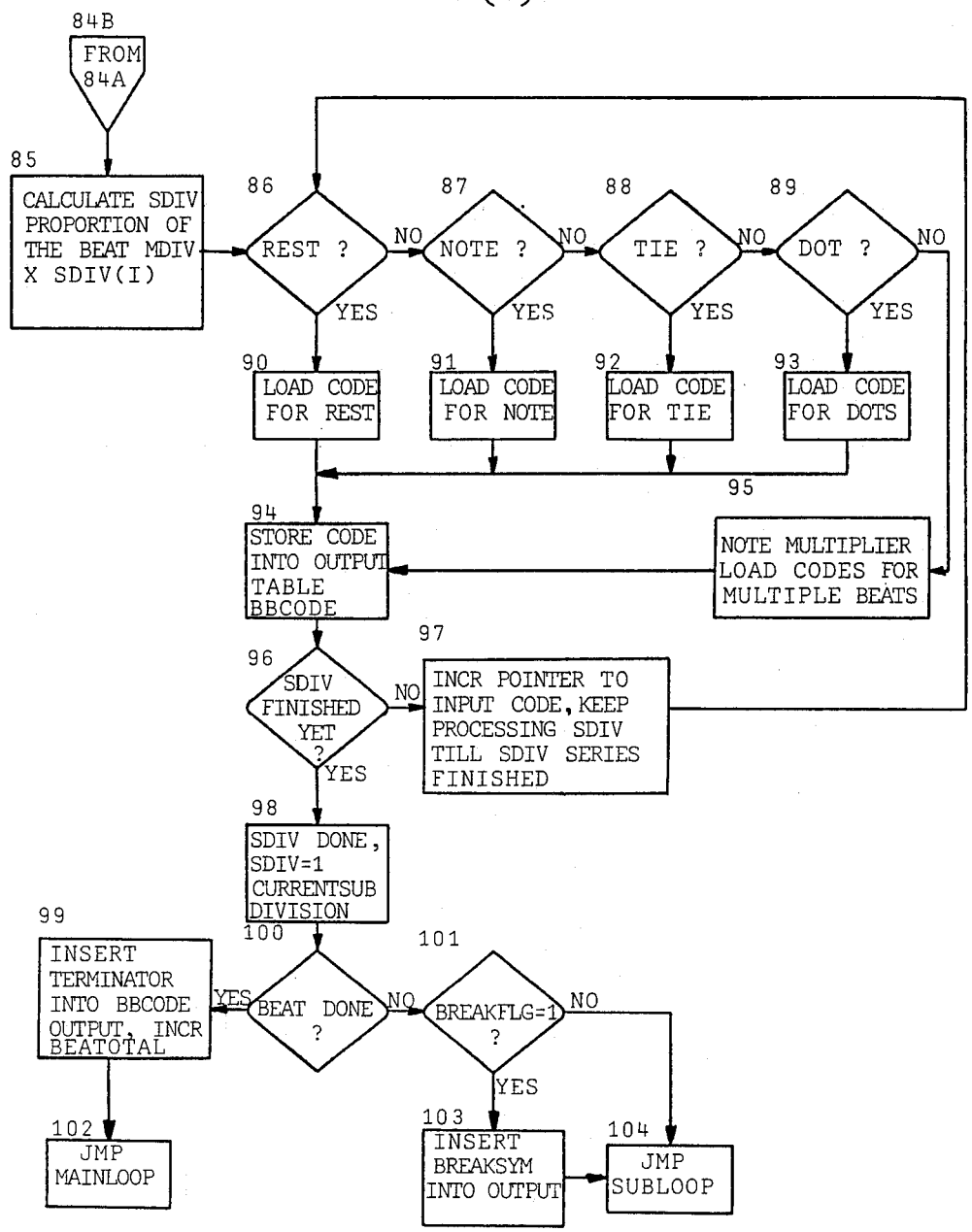

The subroutine BCODI for converting the rhythm codes for a beat in single byte (Simple) form to the intermediate BBCODE is shown in FIGS. 8(a) and 8(b). Simple Form Code for the rhythm codes are input at block 65. The BCODI pointers are initialized at block 66, and the program enters MAINLOOP 67 with a test for termination. One main beat interval at a time is processed through MAINLOOP. If there are multiple main beats in the current beat interval being processed, MAINLOOP is reentered until a termination for the complete sequence is detected, as shown at block 67.

Processing for each main beat interval begins with initialization of the counters for main-divisions and sub-divisions in the beat, at block 63. The rhythm codes are then parsed through the loop 70, 71, 72, 73, 75, 76, 79, until a total count MDIV, at block 74, of main division codes has been counted. MDIV represents the number of main division intervals into which the beat is divided. At blocks 77 and 78, a test is made whether the number of main division codes is two or three, in order to set a BREAKFLG which results in output beamed notation having breaks in the beaming if any subdivisions of a main division are present, according to music notation convention.

The program proceeds to SUBLOOP 80a, 81, 82, 83, 84, where each main division is checked in turn for subdivisions. When the count of subdivision(s) SDIV(i) for the current subdivision is obtained at block 80, the program proceeds to block 85, in FIG. 8(b), where the product of MDIV and SDIV(i) is obtained. This product represents the relative fraction of the beat occupied by each of the rhythm elements expressed by the current main division code and following subdivision code(s). In the loop 86-98, the program parses through each of these fractional rhythm elements and loads the BBCODE representing their fractional proportion of the beat. When the current main division has been processed, the program proceeds with a test whether the current beat is completed, at block 100. If yes, a terminator in BBCODE is inserted, at block 99, and control returns to MAINLOOP at block 102 for conversion of the next main beat interval. If no, a check is made for a BREAKFLG at blocks 101, 103, in order to insert a BREAKSYM code for beam breaking in the final output (mentioned above), and control then returns to SUBLOOP at block 104.

Figure 15D:

Referring to FIGS. 15(a)-15(d), some examples are shown of rhythm codes converted to the BBCODE form. In particular, FIG. 15(d) shows one which includes main division, subdivision, tie and rest codes converted into BBCODE. BBCODE is represented by an integer representing the rhythm element's fractional space in the beat and a character representing the type of rhythm element. BBCODE thus expresses the relative fractions and types of rhythmic elements as a highly compressed data set.

Figure 9:
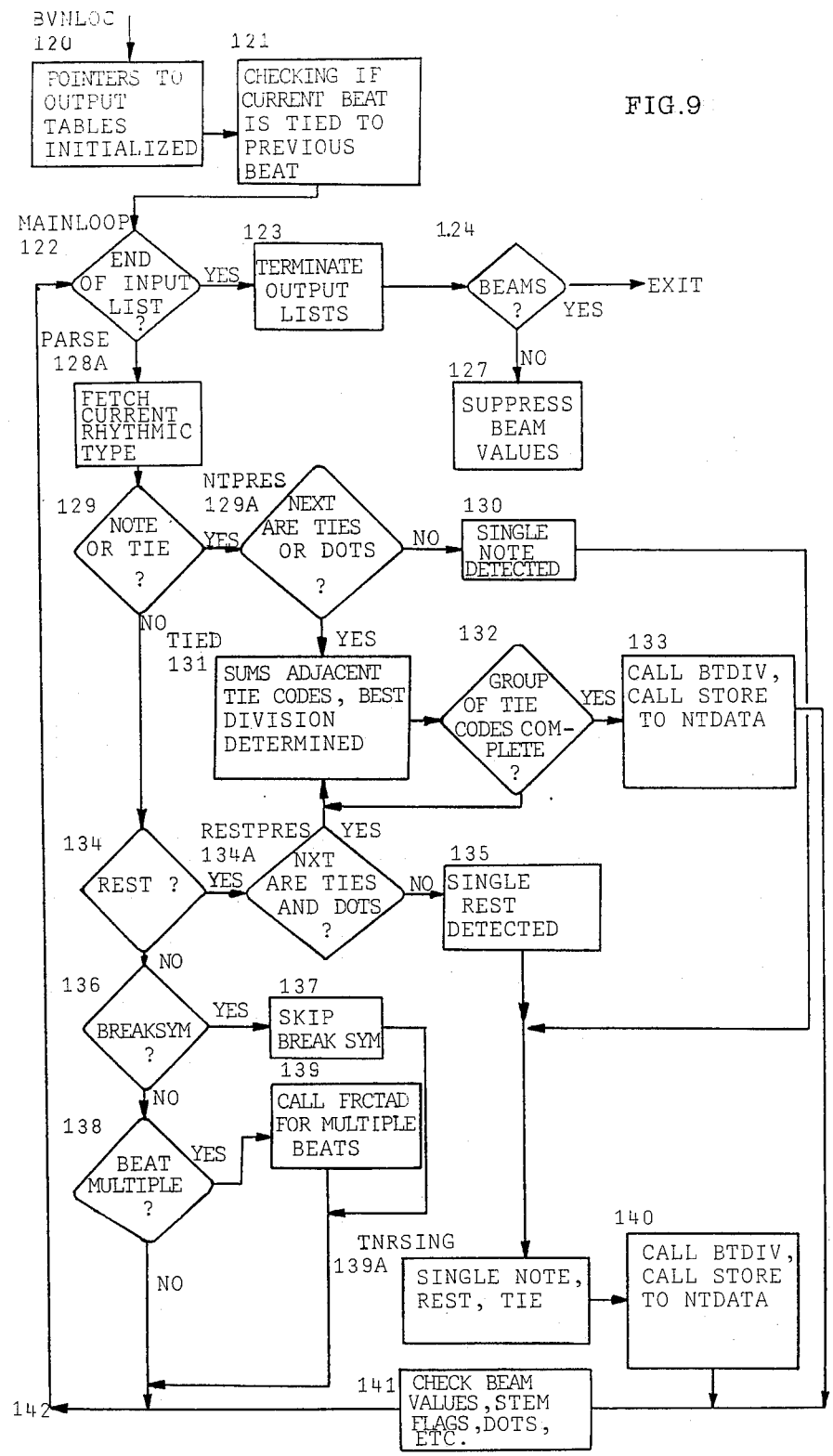
FIG. 9 is a flow diagram of the BVNLOC subroutine of LV1DRW for determining notation parameters for the output of fully featured music notation.

The BVNLOC subroutine shown in FIG. 9 fills in the output table NTDATA with further specification of the various notational and spatial attributes of the output notation corresponding to the pitch and rhythm data in accordance with standard music notation conventions. At block 120, pointers to NTDATA are initialized. A test is made at block 121 if the previous beat is tied to the current beat. If so, then a tie marker is stored in the NTDATA table. MAINLOOP 122 is the entry to a parsing procedure for determining the notational attributes of tied or dotted rhythm elements.

Beginning at block 128a, a test is made at block 129 for a note or tie. If yes, a test is made at block 129a whether the next adjacent elements are ties or dots. If they are not, a single note is detected (block 130), and control goes to blocks 139a and 140 where the subroutine BTDIV is called for computing the attributes of single note, rest or tie. If there are adjacent ties or dots to a note or tie, their number and beat fraction are determined at blocks 131, 132. BTDIV is then called at block 133 to determine the note duration (based on the time signature and relative beat fraction) and the appropriate notational attributes, i.e. type of notehead, stem flags, number of beams, placement of dots, etc., and STORE is called to load all generated attribute information together with the associated pitch data to the output table NTDATA. Tests are made at block 141 for beam values, stem flags, dots, and other data to be stored in NTDATA. Control goes to CONTINUE 142 and returns to MAINLOOP 122.

If the test at block 129 is negative, a test is made at block 134 whether the current rhythmic type is a rest, and if so, blocks 134a, 135, process for a single rest or for a tied or dotted rest, similar to the procedure described above. If the test at block 134 is negative, a subtest for a BREAKSYM (beam break) code is made at blocks 136, 137, and for a multiple beat at block 138. If a multiple beat is present, the subroutine FRACTAD is called to determine the fractions of the beat allocated to the current rhythmic notation. Control then returns to MAINLOOP 122. If the list of rhythmic types for the beat is ended, the program exits at block 123, then tests for beams at block 124. If no beams are present, then the default beam values are suppressed.

After exiting BVNLOC, the further subroutine BMRHY is called to provide further notational attribute information in which the key coordinates, contours and endpoints of the notation elements are specified. The subroutine LV2DRW is then called to generate the complete contour and mapping information for output to the display screen. An example of some of the various notational attributes processed into NTDATA in the processing program is shown in FIG. 14.

Input/Output of Music Data

The notation processing program described above is beat oriented in that it processes input pitch and rhythm data in beat units and outputs a completed beat of music data. As shown in FIG. 3, the notation data processing 24 is the center of input/output flows connecting the input keyboards and devices 21, 22, 22a, the permanent storage 27, and screen display 25. An I/O program loop is shown in FIGS. 10 and 11. Beginning at INLOOP, the program determines whether input data is obtained from a keyboard, the screen display, permanent storage, or a macro buffer. If from a keyboard, input is provided by the keypresses, or if from the screen display, then it is fetched via the screen matrix. Input from permanent storage (hard disk) is fetched via a beat matrix which stores all the addresses for each beat of the entire music for random access and global editing. Regardless of source, input is provided for one beat at a time and processed through the notation processing program to generate one beat of music data output.

The beat output in FIG. 11 may be sent to the screen matrix, a macro buffer, and/or hard disk matrix. Data processed in the notation processing program may be stored on the hard disk as Simple Form Code for the streams of keypresses from the keyboards, intermediate BBCODE representing the rhythmic proportions and types in compressed form and the pitch names, and/or the output table NTDATA for generating a complete display of beat notation. In the I/O program, if the SOUNDFLG is set at block 240, then the output data may provided in the compressed (BBCODE) format suitable for realtime performance. This format may be used, for example, to provide music data to the synthesizer interface 28a, in FIG. 3, for synthesizer performance. For certain high speed or high volume applications, such as printing hard copy, searching, or mass storage, the music data for an entire section or score of music may be held in a cache memory and output in a continuous stream.

Figure 12:
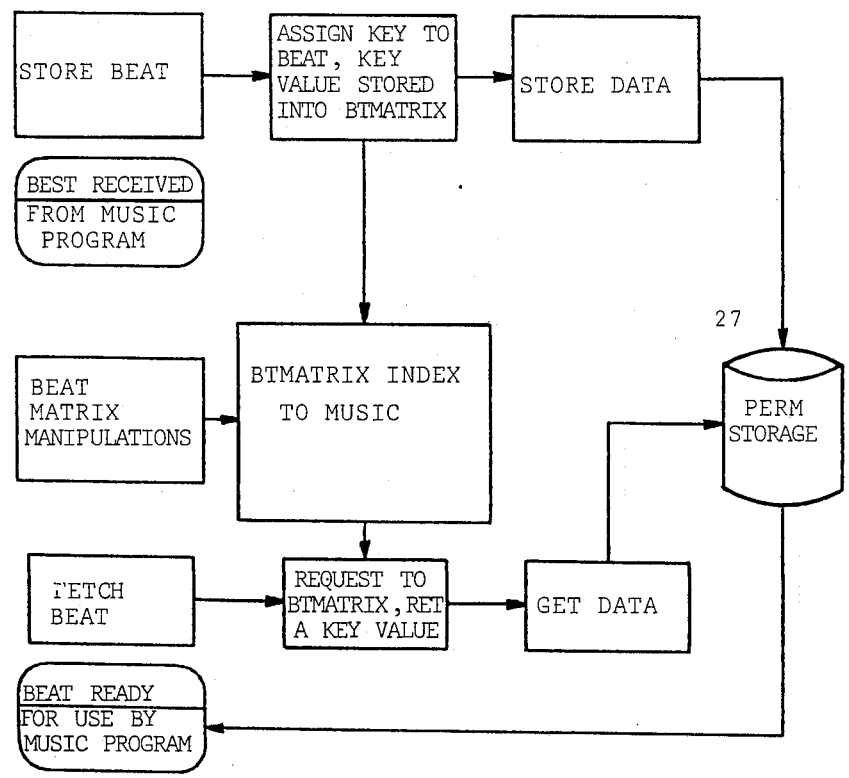
FIG. 12 illustrates storage and retrieval of music data to or from permanent storage in beat units.
Figure 13:
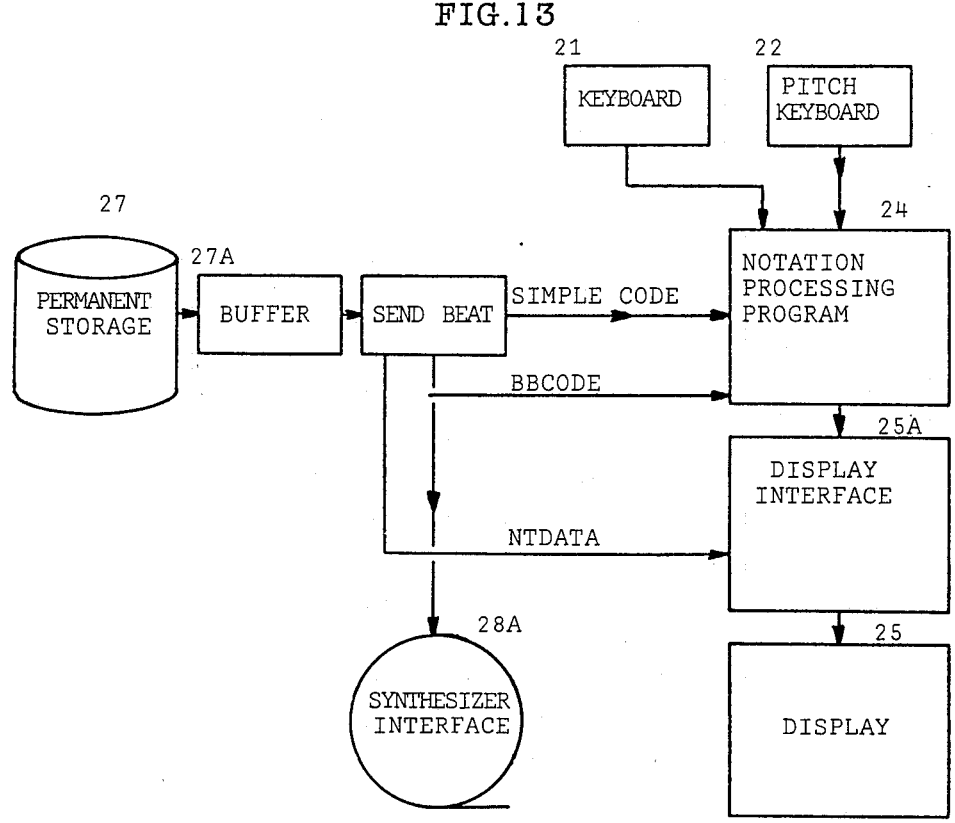
FIG. 13 illustrates regeneration of output data from permanent storage to associated output devices in beat units.

A flowchart for music data storage and retrievel is shown in FIG. 12. In the preferred beat oriented system of the invention, a beat received from the notation processing program is assigned a key address which is stored in BTMATRIX. Searching and retrieval of music is obtained by requesting the key addresses of the music section of interest, and the stored data is loaded in a buffer area where it can be used in the music program or another connected device or interface. Beat matrix manipulations can be performed to relocate sections of music or to copy, or alter data in some way. This facilitates insertions of new material, deletions, or copying, and allows high level manipulation of large data sets.

In FIG. 13, a process for regenerating stored music data is shown. Music data retrieved from permanent storage 27 is held in a buffer 27a from which data is sent in beat units. The beat data may be stored in Simple Form Code, BBCODE, and NTDATA. Simple Form Code can be entered in the notation processing program at the entry point to the BTPROC routine, from which it is regenerated into NTDATA and displayed on the screen. Modifications or new compositional parameters can be specified through keyboards 21, 22, in an editing mode, and the modified beat can be displayed and stored. NTDATA may instead be regenerated from BBCODE by a macro command providing the input in the program sequence to BVNCALL, or retrieved data in NTDATA form may be provided to the display interface 25a. The compressed BBCODE format is suitable for performance of the music in realtime through the synthesizer interface 28a.

Other Functions: Applications

The notation processing program can also have other program sections for entering other notational features on the score in accordance with the full features of standard music notation. Articulation marks may be entered by selection from a list of icons or marks displayed on the screen using function keys on the control keyboard or other computer input device, such as a pointer, touch screen, or mouse. The desired mark is positioned in the proper score area by program control or by movement of a cursor (pointer) to a particular note, beat interval, measure, or position on the staff lines. The program for entering articulation marks includes a function for controlling the movement of the cursor so that it jumps by incremental note, beat, or bar positions for ease of use.

Stored pitch and rhythm codes, as well as the output NTDATA tables, can be retrieved and modified for notation in a different key of music and/or time signature. The pitch and rhythm codes can be independently modified, for example, to produce a stored melody with a different rhythm, or a different melody with the stored rhythm, or some combination of both. Music analysis tools can be applied to analyze melody, harmony, chord progression, rhythm, and other sub-attributes of the full music notation interactively via the display screen, keyboards, or synthesizer. The flexible format of the relative rhythm coding of the invention allows music of any complexity to be easily and rapidly input to the system for printing, modification, or display. The computer system may be interfaced with a printer of typesetting quality for sheet music production. The interface may include routines for compressing data, producing special fonts or marks, etc.

The computerized notation system can be advantageously applied to parts extraction from or to an instrumental work or larger symphonic score. The parts of a symphonic score for different instruments are often printed with different measure and line spacings and notational formats and attributes. The relative proportions of rhythm elements represented by the relative rhythm coding facilitates the recalculation of notational formats. With the editing and modification capability of the system disclosed herein, the several instrument parts can be readily extracted and printed by data file manipulations.

The invention has important advantages over conventional music notation systems. Since the pitch codes are independent from the rhythm codes, the code input need not be played in realtime and less musically skilled persons can operate the system. This increases the utility of the system and allows savings of labor cost in high-volume music notation processing. The expanded capability of transposing the pitch and rhythm codes into another key or time signature makes possible a wide range of automated music publishing functions.

The intermediate BBCODE format is a compressed data set which can be readily adapted as a input to conventional synthesizers. The problem of conventional binary notation conflicting with non-binary time durations in performance, particularly with synthesizers, is obviated since BBCODE preserves the actual relative proportions within a beat, while NTDATA is usable to generate notation according to music convention. Also, digital scanning and feature extraction systems can be used to provide notational input to the present system from printed or handwritten original sheets. The compressed data set BBCODE can be relatively easily derived through feature extraction, and the notation processing program can be used to regenerate the full notational output tables (NTDATA) for display, permanent storage, editing or modification.

Although a preferred implementation of the invention has been described above, it should be understood that many variations and modifications are possible within the disclosed principles of this invention. The rhythm codes might be modified to include other rhythm types or other relative division markers. For example, instead of main division and subdivision markers, numerical values may be assigned to each rhythm element representing their relative proportions within the beat. The basic interval may be a full measure of music instead of a beat. The notation processing program may be simplified, and the beat processing routines may be implemented by ROM addressing or tree-structure decoding of rhythm code sequences rather than program operation. Other types of beat processing algorithms will occur to one skilled in this field given the disclosure herein. Further, other types of peripheral data entry, storage, output, and associated musical devices may be connected to the disclosed system. It is intended that the systems described herein and all such variations and modifications be included within the scope of the invention, as defined in the following claims.

I claim:

1. A computerized music notation system comprising:
   (a) first input means for entering a series of pitch codes representing respective pitches which are to be designated as occurring in a series of basic music intervals of a music piece;
   (b) second input means for entering, separately and independently of said first input, a series of relative rhythm codes for designating respective types of rhythm elements, including said pitches, as occurring in the basic music intervals of the music piece, wherein said relative rhythm codes include at least a series of main division codes, each of which represents a respective main division rhythm element designated as occurring in a basic music interval, and interposed demarcation codes each of which delimits a respective one of the basic music intervals of the music piece, wherein the rhythm codes for each basic music interval includes one or more main division codes and a demarcation code delimiting each said basic music interval;
   (c) third input means for selecting a desired interval duration value to be assigned to each of the basic music intervals corresponding to a selected time signature for a desired music notation output for the music piece;
   (d) computer means connected to said first, second, and third input means and having: (1) programmed counting means for counting the number of main division codes occurring in each basic music interval, as delimited by a respective demarcation code, from said rhythm codes entered through said second input; and (2) programmed duration assigning means for assigning a fixed duration value to each of the main division rhythm elements in each respective basic music interval, said fixed duration value being based upon said selected interval duration value assigned to the basic music intervals divided by the number of main division codes counted by said programmed counting means as occurring in each said basic music interval; and
   (e) output means for providing a music notation output in the selected time signature based upon the rhythm codes designating the rhythm elements including pitches in the basic music intervals of the music piece, the pitch codes representing pitches for the respective rhythm elements, and the fixed duration values assigned to the respective rhythm elements by said computer means.

2. A computerized music notation system according to claim 1, wherein each said basic music interval is a beat unit of music, said interval duration value assigned to the beat units is a selected time signature of the music, and said demarcation code is a terminator code representing the end of each beat unit.

3. A computerized music notation system according to claim 1, wherein said relative rhythm codes include a main division code for rests as another type of rhythm element, representing the relative proportion by which a rest element divides a basic music interval in which it is designated to occur.

4. A computerized music notation system according to claim 1, wherein said relative rhythm codes include a main division code for ties as another type of rhythm element, representing the relative proportion by which a tie element divides a basic music interval in which it is designated to occur.

5. A computerized music notation system according to claim 1, wherein said relative rhythm codes include a main division code for dots as another rhythm type, representing the relative proportion by which a dot element divides a basic music interval in which it is designated to occur.

6. A computerized music notation system according to claim 1, wherein said relative rhythm codes include a pitch subdivision code representing a relative subdivision by a pitch of a main division of a basic music interval.

7. A computerized music notation system according to claim 1, wherein said relative rhythm codes include pitch, rest, tie, and dot subdivision codes representing a relative subdivision by a pitch, rest, tie and dot element, respectively, of a main division of a basic music interval.

8. A computerized music notation system according to claim 7, wherein each division code is a marker for a respective proportional division of a basic music interval, and said programmed counting means of said computer means includes a first program section for counting a first number of main division codes designated in a basic music interval and calculating a fixed duration value to be assigned to each main division element based upon the interval duration value assigned to the basic music interval divided by said first number, and a second program section for counting a second number of subdivision codes within a main division plus the main division code and calculating a fixed duration value to be assigned to the corresponding main division element and each subdivision element of said main division based upon the interval duration value assigned to the basic music interval divided by the product of said first and second numbers.

9. A computerized music notation system according to claim 1, wherein said third input means includes means for selecting a fundamental key of music for the entered pitches, and said computer means includes a pitch program section for assigning proper pitch names to the pitches in accordance with the selected fundamental key of music, and an output program section for specifying coordinate locations and designs of notation elements on staff lines for output by said output means corresponding to said assigned pitch names and fixed duration values.

10. A computerized music notation system according to claim 9, wherein said output program section assembles data specifying said notation elements on output tables, and includes a program subsection for specifying desired attributes of said notation elements.

11. A computerized music notation system according to claim 10, wherein said attributes include a type and location of stem associated with a notation element.

12. A computerized music notation system according to claim 10, wherein said attributes include a type and location of flag associated with a notation element.

13. A computerized music notation system according to claim 10, wherein said attributes include a type, angle, and length of beam associated with two or more notation elements.

14. A computerized music notation system according to claim 2, wherein said relative rhythm codes include a beat multiple code representing a multiple of beat units spanned by a type of rhythm element.

15. A computerized music notation system according to claim 2, wherein said relative rhythm codes, include an autoterminator code for automatically entering a predetermined number of rhythm codes for pitches to occur in each beat unit and a demarcator code delimiting each beat unit.

16. A computerized music notation system according to claim 1, wherein said output means includes a display screen.

17. A computerized music notation system according to claim 1, wherein said output means includes a printer.

18. A computerized music notation system according to claim 1, wherein said output means includes a music synthesizer for generating synthesized sound.

19. A computerized music notation system according to claim 1, wherein said output means includes a permanent storage device, and said computer means includes an input/output program section for storing and retrieving music data to and from said permanent storage device.

20. A computerized music notation system according to claim 19, wherein said input/output program section stores and retrieves original input pitch codes and rhythm codes, and said computer means includes a regeneration program section for regenerating music notation data from pitch and rhythm codes stored and retrieved from said permanent storage device.

21. A computerized music notation system according to claim 19, wherein said computer means includes a modification program section for generating modified music notation data in accordance with currently selected compositional parameters applied to music data stored and retrieved from said permanent storage device.

22. A computerized music notation system according to claim 1, wherein said first input means includes an instrumental keyboard.

23. A computerized music notation system according to claim 1, wherein said second and third input means includes a control keyboard.

24. A computerized music notation system according to claim 1, wherein said second input means includes an ergonometric coding device which is actuated by a physical action of the user other than finger keypressing.

25. A computerized music notation system according to claim 1, wherein said first and second input means are constituted by a scanner device for scanning an original sheet of music notation and providing an input of pitch and rhythm codes based thereon.

26. A computerized music notation system according to claim 1, wherein said computer means includes a code conversion program section for assigning relative proportion values to the rhythm codes in the respective basic music intervals and generating intermediate music data incorporating said pitch codes and said relative proportion values of said rhythm codes.

27. A computerized music notation system according to claim 26, further comprising a synthesizer for generating synthesized sound from an input of said intermediate music data.

28. In a computerized music notation system of the type having first input means for entering a series of pitch codes representing respective pitches occurring in a series of basic music intervals of a music piece, second input means for entering rhythm codes representing respective rhythm elements including said pitches occurring in the series of basic music intervals of the music piece, computer means for processing said pitch codes of said first input means and said rhythm codes of said second input means, and output means for providing a music notation output based upon the processing by said computer means, the improvement of programming means comprising:
(a) a first section for programming said computer means for receiving the series of entered pitch codes;
(b) a second section for programming said computer means for receiving the series of rhythm codes separately and independently of the pitch codes and for designating respective rhythm elements, including pitches, as occurring in the basic music intervals of the music piece, said rhythm codes including at least a series of main division codes each of which represents a respective main division rhythm element designated as occurring in a basic music interval, and interposed demarcation codes each of which delimits a respective one of the basic music intervals of the music piece, wherein the rhythm codes for each basic music interval includes one or more main division codes and a demarcation code delimiting each said basic music interval;
(c) a third section for programming said computer means for selecting a desired interval duration value to be assigned to each of the basic music intervals corresponding to a selected time signature for a desired music notation output for the music piece;
(d) a counting section for programming said computer means for counting the number of main division codes occurring in each basic music interval as delimited by a respective demarcation code;
(e) a duration assigning section for programming said computer means for assigning a fixed duration value to each of the main division rhythm elements in each respective basic music interval, said fixed duration value being based upon said selected interval duration value assigned to the basic music intervals divided by the number of main division codes occurring in each said basic music interval as counted by said counting section;
(f) a pitch name section for programming said computer means for assigning respective pitch names corresponding to said pitch codes received by said first section; and
(g) an output section for programming said computer means for assembling output data corresponding to notation elements designated by the pitch names assigned by said pitch name section, the rhythm elements designated by the rhythm codes received by said second section, and the fixed duration values assigned to the rhythm elements by said duration assigning section.

29. A computerized music notation system according to claim 28, wherein said relative rhythm codes also include main division rhythm codes for ties, rests, and dots which divide a basic duration interval, and subdivision rhythm codes for designating subdivisions of any main division.

30. Programming means for a computerized music notation system according to claim 28, wherein said rhythm codes include subdivision codes representing respective subdivision rhythm elements designated as occurring in associated main division rhythm elements, and wherein said programmed counting section includes a first counting section for counting a first number of main division codes occurring in a basic music interval and calculating a fixed duration value to be assigned to each main division rhythm element based upon the selected interval duration value assigned to the basic music interval divided by said first number, and a second counting section for counting a second number of subdivision codes occurring within a main division plus the corresponding main division code and calculating a fixed duration value to be assigned to the corresponding main division element and to each subdivision element of said main division element based upon the selected interval duration value assigned to the basic music interval divided by the product of said first and second numbers.

31. In a computerized music notation method for use in a computerized music notation system of the type having first input means for entering a series of pitch codes representing respective pitches occurring in a series of basic music intervals of a music piece, second input means for entering rhythm codes representing respective rhythm elements including said pitches occurring in the series of basic music intervals of the music piece, computer means for processing said pitch codes of said first input means and said rhythm codes of said second input means, and output means for providing a music notation output based upon the processing by said computer means, the improvement wherein said music notation method comprises:
(a) entering a series of pitch codes by said first input means;
(b) entering a series of rhythm codes by said second input means separately and independently of the pitch codes of said first input means for designating respective rhythm elements, including pitches, as occurring in the basic music intervals of the music piece, said rhythm codes including at least a series of main division codes each of which represents a respective main division rhythm element designated as occurring in a basic music interval, and interposed demarcation codes each of which delimits a respective one of the basic music intervals of the music piece, wherein the rhythm codes for each basic music interval includes one or more main division codes and a demarcation code delimiting each said basic music interval;
(c) entering an input selection of a desired interval duration value to be assigned to each of the basic music intervals corresponding to a selected time signature for a desired music notation output for the music piece;
(d) processing said entered rhythm codes by counting the number of main division codes occurring in each basic music interval as delimited by a respective demarcation code;
(e) assigning a fixed duration value to each of the main division rhythm elements in each respective basic music interval, said fixed duration value being based upon said selected interval duration value assigned to the basic music intervals divided by the number of main division codes occurring in each said basic music interval;
(f) assigning respective pitch names corresponding to said entered pitch codes; and
(g) assembling output data corresponding to notation elements designated by the assigned pitch names, the rhythm elements designated by the entered rhythm codes, and the fixed duration values assigned to the rhythm elements.

32. A computerized music notation method according to claim 31, wherein said rhythm codes include subdivision codes representing respective subdivision rhythm elements occurring in associated main division rhythm elements, and wherein said processing step includes counting a first number of main division codes occurring in a basic music interval and calculating a fixed duration value to be assigned to each main division rhythm element based upon the selected interval duration value assigned to the basic music interval divided by said first number, and counting a second number of subdivision codes occurring within a main division plus the corresponding main division code and calculating a fixed duration value to be assigned to the corresponding main division element and to each subdivision element of said main division element based upon the selected interval duration value assigned to the basic music interval divided by the product of said first and second numbers.

* * * * *